(12) United States Patent
Shi et al.

(10) Patent No.: US 11,623,503 B2
(45) Date of Patent: Apr. 11, 2023

(54) LOCKING STRUCTURE FOR A TRUCK BED COVER AND A TRUCK

(71) Applicant: CHANGZHOU SUNWOOD INTERNATIONAL TRADING CO., LTD., Changzhou (CN)

(72) Inventors: Hang Shi, Changzhou (CN); Hongjuan Zheng, Changzhou (CN)

(73) Assignee: CHANGZHOU SUNWOOD INTERNATIONAL TRADING CO., LTD., Changzhou (CN)

( * ) Notice: Subject to any disclaimer, the term of this patent is extended or adjusted under 35 U.S.C. 154(b) by 350 days.

(21) Appl. No.: 17/110,343

(22) Filed: Dec. 3, 2020

(65) Prior Publication Data

US 2021/0213814 A1    Jul. 15, 2021

Related U.S. Application Data

(63) Continuation-in-part of application No. 16/737,931, filed on Jan. 9, 2020, now Pat. No. 11,180,011.

(51) Int. Cl.
*B60J 7/19* (2006.01)
*B62D 33/033* (2006.01)

(52) U.S. Cl.
CPC ............ *B60J 7/198* (2013.01); *B62D 33/033* (2013.01)

(58) Field of Classification Search
CPC . B60J 7/198; B60J 7/085; B60J 7/1621; B60J 7/062; B62D 33/033
USPC ... 296/100.17, 100.01, 136.06, 37.6, 100.07, 296/100.16, 98
See application file for complete search history.

(56) References Cited

U.S. PATENT DOCUMENTS

| | | | | |
|---|---|---|---|---|
| 5,931,521 A | * | 8/1999 | Kooiker | B60J 7/141 296/100.09 |
| 6,264,266 B1 | * | 7/2001 | Rusu | B60J 7/1621 296/100.06 |
| 6,422,635 B1 | * | 7/2002 | Steffens | B60J 7/141 296/100.09 |
| 8,690,224 B2 | * | 4/2014 | Maimin | B60P 7/02 296/100.09 |
| 11,059,359 B2 | * | 7/2021 | Dylewski, II | B60J 7/198 |

FOREIGN PATENT DOCUMENTS

CN          209870225 U     12/2019

* cited by examiner

*Primary Examiner* — D Glenn Dayoan
*Assistant Examiner* — Sunsurraye Westbrook
(74) *Attorney, Agent, or Firm* — Bayramoglu Law Offices LLC

(57) ABSTRACT

A locking structure for a truck bed cover includes a side rail and a fixing assembly. The side rail is detachably installed on the truck bed. One side of the side rail is attached to the truck bed, and the other side of the side rail is provided with a first limiting member. The fixing assembly includes an inner clamping block, an outer clamping block and a fastener. The inner clamping block and the outer clamping block lock the truck bed and the side rail by the fastener. The surface attached to the side rail of the outer clamping block is provided with a second limiting member. The first limiting member and the second limiting member are engaged to limit the movement of the side rail. The new locking structure is convenient and quick to install, disassemble and adjust, has good stability, and can be used repeatedly.

14 Claims, 7 Drawing Sheets

LOCKING STRUCTURE FOR A TRUCK BED COVER AND A TRUCK

CROSS REFERENCE TO THE RELATED APPLICATIONS

This application is a continuation-in-part application of U.S. patent application Ser. No. 16/737,931, filed on Jan. 9, 2020, which claims priority to Chinese Patent Application No. 201910292058.0, filed on Apr. 12, 2019.

TECHNICAL FIELD

The present invention relates to the technical field of motor vehicles, and in particular, to a truck and a locking structure for a truck bed cover.

BACKGROUND

Chinese utility model 201920490732.1 shows a locking structure for a truck bed cover (FIG. 1). The truck bed 1' and the side rail 2' are locked by the fixing assembly 3', and the fixing assembly 3' includes the inner clamping block 31', the outer clamping block 32' and the fastener 33'. This structure has the following problems.

1. The hook portion 323' is provided on the outer clamping block 32' to hook the protrusion 26' on the side rail 2'. When the outer clamping block 32' is installed on the side rail 2' or removed from the side rail 2', the outer clamping block 32' will be deformed, the outer clamping block 32' is, therefore, required to have a certain amount of resiliency. Moreover, this structure is inconvenient for the installation and disassembly of the outer clamping block 32'. After being installed and disassembled repeatedly, the outer clamping block 32' is permanently deformed. As a result, the hook portion 323' has an excessively large opening angle and thus cannot hook the protrusion 26', or the side rail 2' cannot be completely attached to the outer clamping block 32', which reduces the locking effect between the truck bed 1' and the side rail 2' and weakens the overall stability.

2. The first clamping surface 311' on the inner clamping block 31' is in a sawtooth shape, and the first pressure-bearing surface 321' of the outer clamping block 32' is also in a sawtooth shape that matches the first clamping surface 311'. Since the first clamping surface 311' and the first pressure-bearing surface 321' are both in a sawtooth shape, when the inner clamping block 31' is adjusted up and down, the fastener 33' needs to be loosened until the sawtooth outer end of the first clamping surface 311' is completely separated from the sawtooth outer end of the first pressure-bearing surface 321'. In this regard, the fastener 33' needs to be loosened substantially, which is inconvenient to operate, especially when only fine adjustment is required. The prior locking device disclosed is time-consuming, laborious and inconvenient in its operation.

SUMMARY

In order to solve the technical problem that the locking structure for a truck bed cover in the prior art is inconvenient to install and disassemble and has poor stability after repeated use, the present invention proposes a locking structure for a truck bed cover, which is convenient and quick to install and disassemble, has good stability and can be used repeatedly for a long time.

The technical solution of the present invention is as follows.

A locking structure for a truck bed cover includes:
a side rail, wherein the side rail is detachably installed on a truck bed, one side of the side rail is attached to the truck bed, and a first limiting member is arranged on the other side of the side rail;
a fixing assembly, wherein the fixing assembly includes an inner clamping block, an outer clamping block and a fastener; the inner clamping block and the outer clamping block lock the truck bed and the side rail by the fastener, a second limiting member is provided on the surface, attached to the side rail, of the outer clamping block, the first limiting member and the second limiting member are engaged to limit a movement of the side rail.

Further, the first limiting member is a limiting groove which is arranged on the side rail, the second limiting member is a limiting protrusion which is arranged on the outer clamping block, and the limiting protrusion extends into the limiting groove to limit the side rail.

Alternatively, the first limiting member is a limiting protrusion which is arranged on the side rail, the second limiting member is a limiting groove which is arranged on the outer clamping block, and the limiting protrusion extends into the limiting groove to limit the side rail.

Further, the side rail includes a lateral support surface and an inclined support surface, and the transitional connection surface between the lateral support surface and the inclined support surface is provided with the first limiting member.

Further, the outer clamping block is provided with an inclined attaching surface for pressing the inclined support surface.

Further, the end in contact with the outer clamping block of the lateral support surface extends in a direction opposite to the fastener to form a first protrusion, and the end in contact with the lateral support surface of the outer clamping block extends in the opposite direction to the fastener to form a second protrusion, and the second protrusion presses the first protrusion.

Further, the inner clamping block includes a first pressing surface, and the outer clamping block includes a first pressure-bearing surface which matches and is to be pressed by the first pressing surface. The first pressing surface is in a sawtooth shape or is a matte surface, and the first pressure-bearing surface is flat.

Further, the inner clamping block further includes a second pressing surface which presses the side wall of the truck bed, the second pressing surface is in a sawtooth shape or is a matte surface, and the side wall of the truck bed is flat.

According to another aspect of the present invention, a truck is provided, including any one of the locking structures for a truck bed cover described above.

By adopting the above technical solution, the present invention has the following advantages compared with the prior art.

1. In the present invention, the first limiting member is provided on the other side of the side rail and engaged with the second limiting member arranged on the outer clamping block to facilitate convenient and quick installation and disassembly. Moreover, the outer clamping block will not be deformed in the process of installation and disassembly, as a result, the locking structure for a truck bed cover of the present invention can maintain a good locking effect even after repeated use, and thus has good stability, and can be used for a long time.

2. In the present invention, the first limiting member is arranged on the transitional connection surface between the lateral support surface and the inclined support surface, so that when the truck bed and the side rail are locked, the locking force is almost borne by the lateral support surface, which prevents the inclined support surface of the side rail from being deformed due to excessive force on part of the inclined support surface to avoid causing damage to the side rail;

3. In the present invention, the first pressing surface of the inner clamping block is in a sawtooth shape or is a matte surface, and the first pressure-bearing surface is flat. The second pressing surface is in a sawtooth shape or is a matte surface, and the side wall corresponding to the second pressing surface of the truck bed cover is flat. In this way, the inner clamping block can be adjusted only by loosening the fastener slightly, which is convenient to operate, especially when only fine adjustment is required, the adjustment speed is fast, with high efficiency and great convenience.

Figure 1:
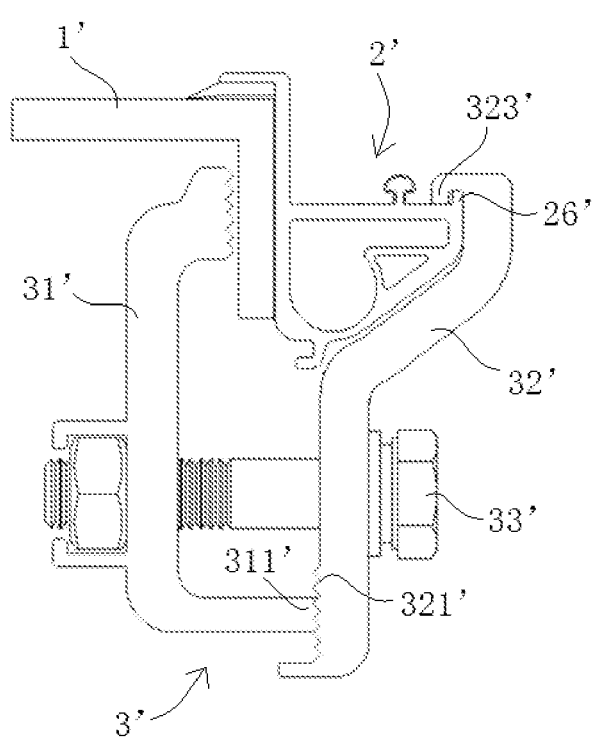
FIG. 1 is a structural schematic diagram of a locking structure for a truck bed cover in the prior art.

In the figures,

1'—truck bed, 2'—side rail, 26'—protrusion, 3'—fixing assembly, 31'—inner clamping block, 311'—first clamping surface, 32'—outer clamping block, 321'—first pressure-bearing surface, 323'—hook portion, 33'—fastener;

1—truck bed, 11—side wall, 2—side rail, 21—first limiting member, 22—vertical support surface, 23—lateral support surface, 24—inclined support surface, 25—transitional connection surface, 26—first protrusion, 3—fixing assembly, 31—inner clamping block, 311—first pressing surface, 312—second pressing surface, 32—outer clamping block, 321—first pressure-bearing surface, 322—second limiting member, 323—second protrusion, 324—vertical attaching surface, 325—inclined attaching surface, 326—waist circular hole, 33—fastener.

DETAILED DESCRIPTION OF THE EMBODIMENTS

The technical solutions in the embodiments of the present invention will be clearly and completely described with reference to the drawings in the embodiments of the present invention. Obviously, the described embodiments are only a part of the embodiments of the present invention, rather than all the embodiments of the present invention. The following description of the at least one exemplary embodiment is only illustrative, and in no way serves as any limitation on the present invention and its application or use. Based on the embodiments of the present invention, all other embodiments obtained by those of ordinary skill in the art without creative efforts shall fall within the scope of protection of the present invention.

It should be noted that the terms used herein are only for describing the specific embodiments, rather than to limit the exemplary embodiments according to the present application. As used herein, unless the context clearly indicates, the singular form also intends to include the plural form. In addition, it should also be understood that the terms "comprise" and/or "include" used in this specification indicate there are features, steps, operations, devices, components, and/or combinations thereof.

Unless specifically stated, the relative arrangement of components and steps, numerical expressions and numerical values set forth in these embodiments do not limit the scope of the present invention. Meanwhile, it should be understood that, for ease of description, the sizes of the various parts shown in the drawings are not drawn in accordance with actual scale. The technologies, methods, and equipment known to those of ordinary skill in the relevant fields may not be discussed in detail, but in appropriate situation, the technologies, methods, and equipment should be regarded as part of the authorized specification. In all the examples shown and discussed herein, any specific values should be interpreted as merely exemplary rather than restrictive. Therefore, other examples of the exemplary embodiments may have different values. It should be noted that similar reference numerals and letters indicate similar items in the following drawings. Therefore, once an item is defined in one drawing, it does not need to be further discussed in the subsequent drawings.

In the description of the present invention, it needs to be understood that the orientation words such as "front, back, up, down, left, right", "lateral, vertical, perpendicular, horizontal" and "top, bottom" indicate the orientation or positional relationship generally based on the orientation or positional relationship shown in the drawings, which are only for the convenience of describing the present invention and simplifying the description. Unless otherwise stated, these orientation words do not indicate or imply the pointed device or element must have a specific orientation or be constructed and operated in a specific orientation, and thus cannot be understood as a limitation on the scope of protection of the present invention. The orientation words "inner and outer" refer to the inner and outer parts relative to the contour of each element itself.

For ease of description, spatial relative terms used herein, such as "above", "over", "on the surface", "upper", are intended to describe the spatial positional relationship between one device or feature and other devices or features as shown in the drawings. It should be understood that the spatial relative terms are intended to encompass not only the orientation of the device described in the drawings, but also different orientations in use or operation. For example, if the device in the drawing is inverted, then a device described as "above other devices or configurations" or "over other devices or configurations" will be positioned as "under other devices or configurations" or "below other devices or configurations". Thus, the exemplary term "above" can include both orientations "above" and "under". The device can also be positioned in other different ways (rotated by 90 degrees or in other orientations), and the relative description of the space used here is explained accordingly.

In addition, it should be noted that the terms such as "first" and "second" used to define parts are only for the convenience of distinguishing the corresponding parts. Unless otherwise stated, the above terms have no special meaning, and thus cannot be understood as a limitation on the scope of protection of the present invention.

Embodiment 1

Figure 2:
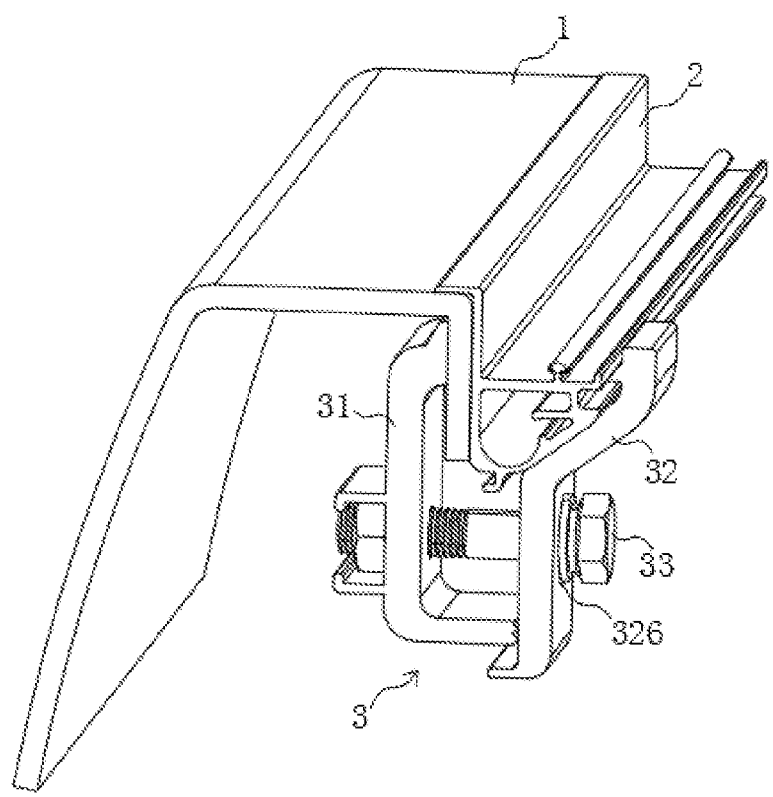
FIG. 2 is a perspective view of a locking structure for a truck bed cover according to Embodiment 1.
Figure 3:
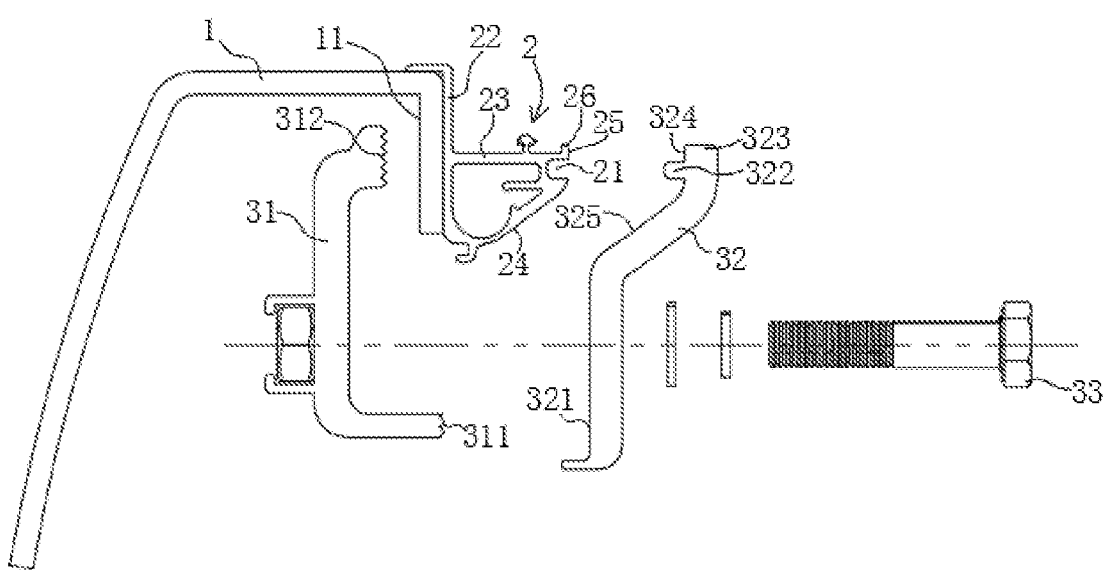
FIG. 3 is an exploded view of the locking structure for a truck bed cover according to Embodiment 1.
Figure 4:
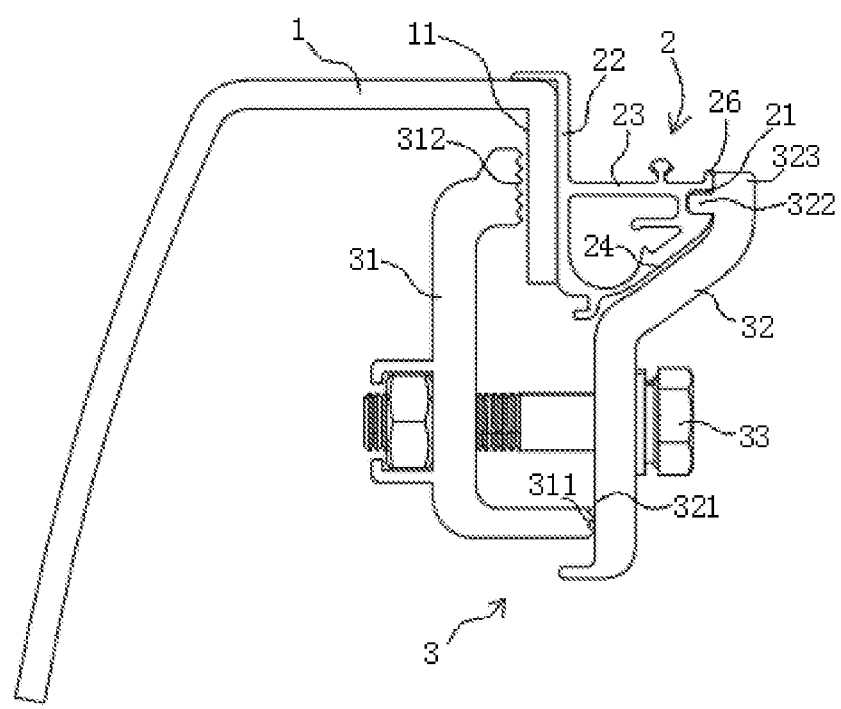
FIG. 4 is a structural schematic diagram of the locking structure for a truck bed cover according to Embodiment 1.

As shown in FIGS. 2-4, the locking structure for a truck bed cover of the present embodiment includes the side rail 2 and the fixing assembly 3. The truck bed 1 and the side rail 2 are fixed and locked by the fixing assembly 3. Specifically, the side rail 2 is detachably installed on the truck bed 1. One side of the side rail 2 is attached to the truck bed 1, and the other side of the side rail 2 is provided with the first limiting member 21. Further, the fixing assembly 3 of the present embodiment includes the inner clamping block 31, the outer clamping block 32 and the fastener 33. The first end of the inner clamping block 31 presses the outer clamping block 32, and the second end of the inner clamping block 31 presses the side wall 11 of the truck bed 1. The outer clamping block 32 is provided with a surface which is attached to the side rail 2. The inner clamping block 31 and the outer clamping block 32 lock the truck bed 1 and the side rail 2 by the fastener 33. The surface attached to the side rail 2 of the outer clamping block 32 is provided with the second limiting member 322. The first limiting member 21 and the second limiting member 322 are engaged to limit the movement of the side rail 2.

Preferably, in the present embodiment, the first limiting member 21 is a limiting groove arranged on the side rail 2, and the second limiting member 322 is a limiting protrusion arranged on the outer clamping block 32. The limiting protrusion extends into the limiting groove to limit the side rail 2. Specifically, the side rail 2 of the present embodiment includes the vertical support surface 22, the lateral support surface 23, the inclined support surface 24, and the transitional connection surface 25 between the lateral support surface 23 and the inclined support surface 24, wherein the vertical support surface 22 is arranged on one side of the side rail 2 and is attached to the truck bed 1, and the inclined support surface 24 and the transitional connection surface 25 are arranged on the other side of the side rail 2. The limiting groove of the present embodiment is arranged on the transitional connection surface 25.

In this way, when the outer clamping block 32 is installed on the side rail 2, it is only required to move the outer clamping block 32 toward the side rail 2 on the left side, so that the limiting protrusion extends into the limiting groove. When removing the outer clamping block 32, the outer clamping block 32 is directly removed toward the right side, which is convenient to install and disassemble. In addition, since the outer clamping block 32 and the side rail 2 will not be deformed during the process of installation and disassembly, the locking effect between the outer clamping block 32 and the side rail 2 will not be affected even if they are repeatedly used for a long time. As a result, the locking structure for a truck bed cover of the present embodiment has a long service life and good stability.

A limiting groove is provided on the other side of the side rail 2 and engaged with the limiting protrusion arranged on the outer clamping block 32, which facilitates convenient and quick installation. In addition, the outer clamping block 32 will not be deformed, so that the locking structure for a truck bed cover of the present embodiment has good stability and can be used for a long time.

Further, in the present embodiment, the limiting groove is arranged on the transitional connection surface 25 between the lateral support surface 23 and the inclined support surface 24, so that when the truck bed 1 and the side rail 2 are locked, the locking force is borne by the lateral support surface 23, which prevents the inclined support surface 24 of the side rail 2 from being deformed due to excessive force on part of the the inclined support surface 24 to avoid causing damage to the side rail 2.

Preferably, in the present embodiment, the surface attached to the side rail 2 of the outer clamping block 32 includes not only the vertical attaching surface 324 provided with the limiting protrusion, but also the inclined attaching surface 325 attached to the inclined support surface 24. In this arrangement, the side rail 2 is more evenly stressed when being locked, without being deformed and damaged.

Preferably, in the present embodiment, the end in contact with the outer clamping block 32 of the lateral support surface 23 of the side rail 2 extends in a direction opposite to the fastener 33 to form the first protrusion 26. The end in contact with the lateral support surface 23 of the outer clamping block 32 extends in the direction opposite to the fastener 33 to form the second protrusion 323. The first protrusion 26 is convenient for being connected to other components such as latch components. In addition, the second protrusion 323 presses the first protrusion 26 to further increase the contact area between the outer clamping block 32 and the side rail 2 for improving the locking effect.

As shown in FIG. 4, in the present embodiment, the first end of the inner clamping block 31 extends toward the outer clamping block 32 to form the first pressing surface 311, and the outer clamping block 32 is correspondingly provided with the first pressure-bearing surface 321 which matches and is to be pressed by the first pressing surface 311. The first pressing surface 311 is in a sawtooth shape or is a matte surface, and the first pressure-bearing surface 321 is flat. Certainly, the first pressing surface 311 can be flat, and the first pressure-bearing surface 321 is in a sawtooth shape or is a matte surface. Further, the second end of the inner clamping block 31 is formed with the second pressing surface 312, and the second pressing surface 312 presses the side wall 11 of the truck bed 1. The second pressing surface 312 is in a sawtooth shape or is a matte surface, and the side wall 11 of the truck bed 1 is flat. In addition, as shown in FIG. 2, the outer clamping block 32 is provided with the waist circular hole 326 for adjusting the fastener 33 up and down. In this way, the inner clamping block 31 is adjusted only by slightly loosening the fastener 33, which is convenient to operate, especially when only fine adjustment is required, the adjustment speed is fast, with high efficiency and great convenience.

The locking structure for a truck bed cover is very convenient and quick to install, disassemble and adjust, has good stability and can be used repeatedly for a long time.

Embodiment 2

Figure 5:
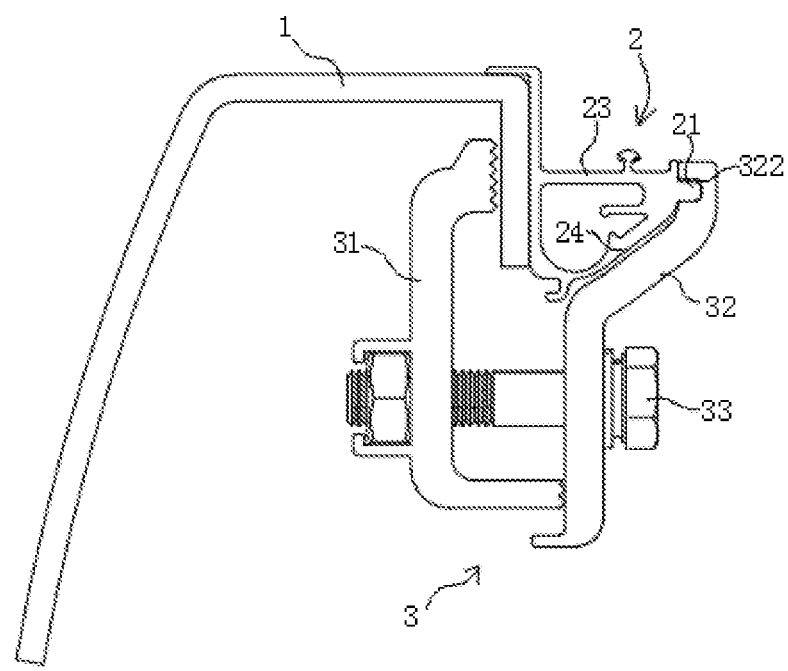
FIG. 5 is a structural schematic diagram of a locking structure for a truck bed cover according to Embodiment 2.

As shown in FIG. 5, the difference between the locking structure for a truck bed cover of the present embodiment and the locking structure for a truck bed cover of Embodiment 1 is that the first limiting member 21 in the present embodiment is a limiting protrusion arranged on the transitional connection surface 25 of the side rail 2, the second limiting member 322 is a limiting groove arranged on the vertical attaching surface 324 of the outer clamping block 32, and the limiting protrusion extends into the limiting groove to limit the side rail 2, which can also have the same advantages as Embodiment 1.

Embodiment 3

Figure 6:
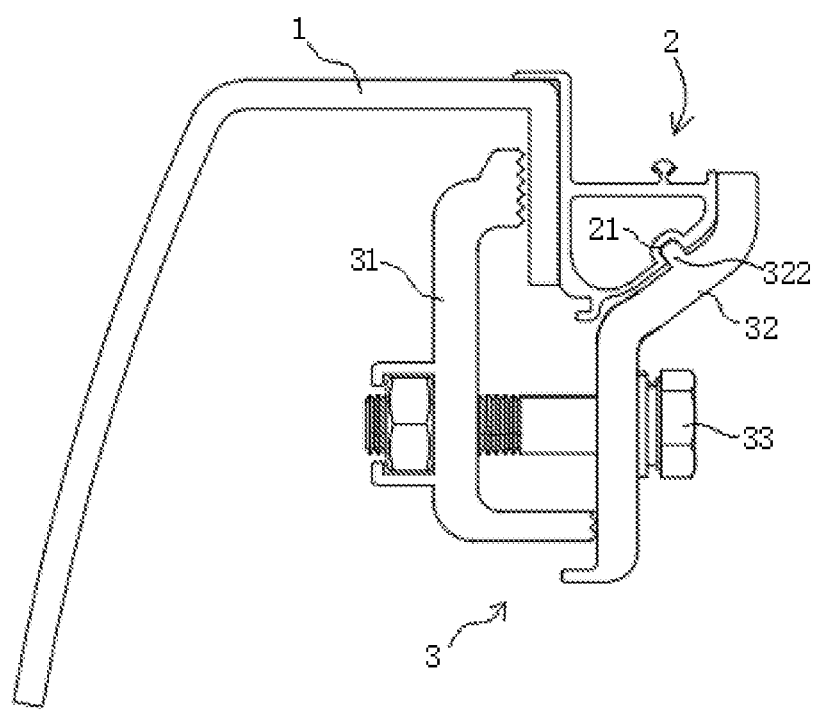
FIG. 6 is a structural schematic diagram of a locking structure for a truck bed cover according to Embodiment 3.

As shown in FIG. 6, the difference between the locking structure for a truck bed cover of the present embodiment and the locking structure for a truck bed cover of Embodiment 1 is that the first limiting member 21 in the present embodiment is a limiting groove arranged on the inclined support surface 24 of the side rail 2, the second limiting member 322 is a limiting protrusion arranged on the inclined attaching surface 325 of the outer clamping block 32, and the limiting protrusion extends into the limiting groove to limit the side rail 2, thereby effectively locking the truck bed 1 and side rail 2, which makes the structure easy and quick to install and disassemble.

Embodiment 4

Figure 7:
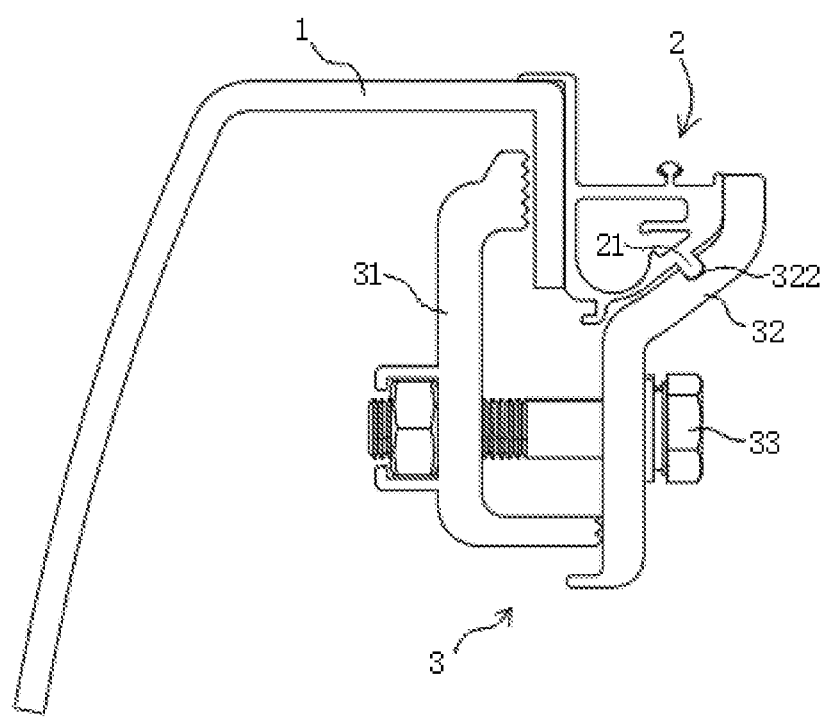
FIG. 7 is a structural schematic diagram of a locking structure for a truck bed cover according to Embodiment 4.

As shown in FIG. 7, the difference between the locking structure for a truck bed cover of the present embodiment and the locking structure for a truck bed cover of Embodiment 1 is that the first limiting member 21 in the present embodiment is a limiting protrusion arranged on the inclined support surface 24 of the side rail 2, the second limiting member 322 is a limiting groove arranged on the inclined attaching surface 325 of the outer clamping block 32, and the limiting protrusion extends into the limiting groove to limit the side rail 2, thereby effectively locking the truck bed 1 and side rail 2, which makes the structure easy and quick to install and disassemble.

Embodiment 5

The present embodiment provides a truck including the locking structure for a truck bed cover of any one of the embodiments described above, and the specific implementations can refer to the above embodiments, which will not be repeated here.

The above descriptions are only the preferred specific embodiments of the present invention, but the scope of protection of the present invention is not limited thereto. Equivalent replacements or changes made by any person familiar with the technical field according to the technical solution and the concept of the present invention within the disclosed technical scope of the present invention shall be contained in the scope of protection of the present invention.

What is claimed is:

1. A locking structure for a truck bed cover, comprising:
a side rail, and
a fixing assembly; wherein
the side rail is detachably installed on a truck bed;
a first side of the side rail is attached to the truck bed, and a second side of the side rail is provided with a first limiting member; and
the fixing assembly comprises an inner clamping block, an outer clamping block and a fastener;
the inner clamping block and the outer clamping block lock the truck bed and the side rail by the fastener;
a surface of the outer clamping block is provided with a second limiting member, wherein the surface of the outer clamping block is attached to the side rail; and
the first limiting member and the second limiting member are engaged to limit a movement of the side rail.

2. The locking structure according to claim 1, wherein
the first limiting member is a limiting groove arranged on the side rail, the second limiting member is a limiting protrusion arranged on the outer clamping block, and the limiting protrusion extends into the limiting groove to limit the side rail; or
the first limiting member is a limiting protrusion arranged on the side rail, the second limiting member is a limiting groove arranged on the outer clamping block, and the limit protrusion extends into the limit groove to limit the side rail.

3. The locking structure according to claim 1, wherein
the side rail comprises a lateral support surface and an inclined support surface; and
a transitional connection surface between the lateral support surface and the inclined support surface is provided with the first limiting member.

4. The locking structure according to claim 3, wherein
the outer clamping block is provided with an inclined attaching surface for pressing the inclined support surface.

5. The locking structure according to claim 3, wherein
an end of the lateral support surface extends in a direction opposite to the fastener to form a first protrusion, wherein the end of the lateral support surface is in contact with the outer clamping block;
an end of the outer clamping block extends in the direction opposite to the fastener to form a second protrusion, wherein the end of the outer clamping block is in contact with the lateral support surface; and
the second protrusion presses the first protrusion.

6. The locking structure according to claim 1, wherein
the inner clamping block comprises a first pressing surface,
the outer clamping block comprises a first pressure-bearing surface, and the first pressure-bearing surface matches the first pressing surface and is pressed by the first pressing surface,
the first pressing surface is in a sawtooth shape or is a matte surface, and
the first pressure-bearing surface is flat.

7. The locking structure according to claim 1, wherein
the inner clamping block comprises a second pressing surface, and the second pressing surface presses a side wall of the truck bed,
the second pressing surface is in a sawtooth shape or is a matte surface, and the side wall of the truck bed is flat.

8. A truck, comprising the locking structure according to claim 1.

9. The truck according to claim 8, wherein
the first limiting member is a limiting groove arranged on the side rail, the second limiting member is a limiting protrusion arranged on the outer clamping block, and the limiting protrusion extends into the limiting groove to limit the side rail; or
the first limiting member is a limiting protrusion arranged on the side rail, the second limiting member is a limiting groove arranged on the outer clamping block, and the limit protrusion extends into the limit groove to limit the side rail.

10. The truck according to claim 8, wherein
the side rail comprises a lateral support surface and an inclined support surface; and
a transitional connection surface between the lateral support surface and the inclined support surface is provided with the first limiting member.

11. The truck according to claim 10, wherein
the outer clamping block is provided with an inclined attaching surface for pressing the inclined support surface.

12. The truck according to claim 10, wherein
an end of the lateral support surface extends in a direction opposite to the fastener to form a first protrusion, wherein the end of the lateral support surface is in contact with the outer clamping block;
an end of the outer clamping block extends in the direction opposite to the fastener to form a second protrusion, wherein the end of the outer clamping block is in contact with the lateral support surface; and
the second protrusion presses the first protrusion.

13. The truck according to claim 8, wherein
the inner clamping block comprises a first pressing surface,
the outer clamping block comprises a first pressure-bearing surface, and the first pressure-bearing surface matches the first pressing surface and is pressed by the first pressing surface,
the first pressing surface is in a sawtooth shape or is a matte surface, and
the first pressure-bearing surface is flat.

14. The truck according to claim 8, wherein
the inner clamping block comprises a second pressing surface, and the second pressing surface presses a side wall of the truck bed,
the second pressing surface is in a sawtooth shape or is a matte surface, and the side wall of the truck bed is flat.

* * * * *